United States Patent
Peng

(10) Patent No.: US 9,631,760 B2
(45) Date of Patent: Apr. 25, 2017

(54) OIL DRAIN CONNECTOR

(71) Applicant: I-Sin Peng, Taichung (TW)

(72) Inventor: I-Sin Peng, Taichung (TW)

( * ) Notice: Subject to any disclaimer, the term of this patent is extended or adjusted under 35 U.S.C. 154(b) by 847 days.

(21) Appl. No.: 14/057,070

(22) Filed: Oct. 18, 2013

(65) Prior Publication Data

US 2015/0108750 A1    Apr. 23, 2015

(51) Int. Cl.
  *F16L 55/07* (2006.01)
  *B01D 17/02* (2006.01)

(52) U.S. Cl.
  CPC .......... *F16L 55/07* (2013.01); *B01D 17/0214* (2013.01)

(58) Field of Classification Search
  CPC .................................. A47J 31/46; F16L 55/07
  USPC ........................ 285/124.1, 924; 251/144, 904
  See application file for complete search history.

(56) References Cited

U.S. PATENT DOCUMENTS

| | | | | |
|---|---|---|---|---|
| 3,207,109 A | * | 9/1965 | Hammargren | B65D 7/04 29/521 |
| 3,540,402 A | * | 11/1970 | Kocher | H01M 2/362 137/454 |
| 3,606,069 A | * | 9/1971 | Campbell | A47B 31/00 220/23.4 |
| 4,724,074 A | * | 2/1988 | Schaupp | B01D 17/0214 210/163 |
| 6,478,058 B1 | * | 11/2002 | Pears | B65D 25/48 141/255 |
| 8,272,368 B2 | * | 9/2012 | Wickstone | F02D 19/08 123/468 |

* cited by examiner

*Primary Examiner* — David E Sosnowski
*Assistant Examiner* — James A Linford
(74) *Attorney, Agent, or Firm* — Jackson IPG PLLC; Demian K. Jackson

(57) ABSTRACT

An oil drain connector includes a main body and a sleeve. When it is required to release pressure, a sleeve is turned to loosen an upper section of an outer threaded portion of the main body relative to a container. Because an air outlet is slightly higher than a liquid inlet in the vertical direction, the liquid inside the container is first contact with a liquid inlet to pass through a first channel and then to be drained through a liquid outlet. At this time, the air enters a second channel through an air inlet, and then enters the container for the liquid to be drained smoothly.

4 Claims, 5 Drawing Sheets

OIL DRAIN CONNECTOR

BACKGROUND OF THE INVENTION

1. Field of the Invention

The present invention relates to an oil drain technique, and more particularly to an oil drain connector able to release pressure and to present the liquid from leaking.

2. Description of the Prior Art

In a conventional seal container, such as a water filter or an oil-water separator, when the liquid (such as oil) inside the container reaches a certain level, the liquid must be drained to prevent the efficiency of the water filter or the oil-water separator from being lowered.

For draining the oil, the bottom of the container is provided with a liquid drain device. The liquid drain device is detachably connected to the bottom of the container. The liquid drain device has a liquid channel. When it is required to drain the liquid, the liquid drain device is loosened relative to the bottom of the container for the air to enter the container from the gap between the liquid drain device and the container. At the same time, the liquid inside the container is drained from the liquid channel.

However, because the pressure inside the container is larger than the pressure (atmospheric pressure) out of the container, the liquid inside the container may leak from the gap between the liquid drain device and the container to wet other positions. It is very inconvenient for use.

Accordingly, the inventor of the present invention has devoted himself based on his many years of practical experiences to solve this problem.

SUMMARY OF THE INVENTION

The primary object of the present invention is to provide an oil drain connector.

The oil drain connector has a simple structure with a channel for air flow, and is convenient for installation. When in use, it is easy to operate the present invention and the liquid won't leak out from other positions.

In order to achieve the aforesaid object, the oil drain connector of the present invention comprises a main body and a sleeve. The main body has a head portion, an axial portion, an annular engaging portion, an outer threaded portion, and a bottom portion. The axial portion has two ends respectively connected to the head portion and the bottom portion. The outer threaded portion is disposed on the axial portion and located between the head portion and the bottom portion. The annular engaging portion is disposed on the outer threaded portion to divide the outer threaded portion into an upper section and a lower section. The annular engaging portion has a plurality of spaced notches formed around a circumferential portion thereof. The bottom portion has a liquid outlet and an air inlet. The axial portion has a liquid inlet, an air outlet, a first channel, and a second channel. The liquid inlet is disposed at one side of the axial portion and located between the head portion and the upper section of the outer threaded portion. The first channel is disposed inside the axial portion and communicates with the liquid inlet and the liquid outlet of the bottom portion. The air outlet is disposed at another side of the axial portion, opposite to the liquid inlet, and located between the head portion and the upper section of the outer threaded portion. The second channel is disposed inside the axial portion and separated from the first channel. The second channel communicates with the air outlet and the air inlet of the bottom portion. The sleeve has an inner threaded portion, an annular side wall and a plurality of protrusions. The inner threaded portion is screwed to the lower section of the outer threaded portion of the main body. The annular side wall extends from the outer circumferential edge of the top end of the inner threaded portion toward the head portion of the main body. The protrusions are disposed between the inner threaded portion and the annular side wall, and correspond in position to the notches of the annular engaging portion to engage with each other.

In some embodiments, the annular side wall of the sleeve has a skidproof outer surface.

In one embodiment, the air outlet is located more close to the head portion than the liquid inlet.

In addition, in some embodiments, the oil drain connector further comprises a cover and an O-shaped ring. The cover is to cover the head portion of the main body.

The O-shaped ring is fitted on the axial portion of the main body and located under the head portion.

DETAILED DESCRIPTION OF THE PREFERRED EMBODIMENTS

Embodiments of the present invention will now be described, by way of example only, with reference to the accompanying drawings.

Figure 1:
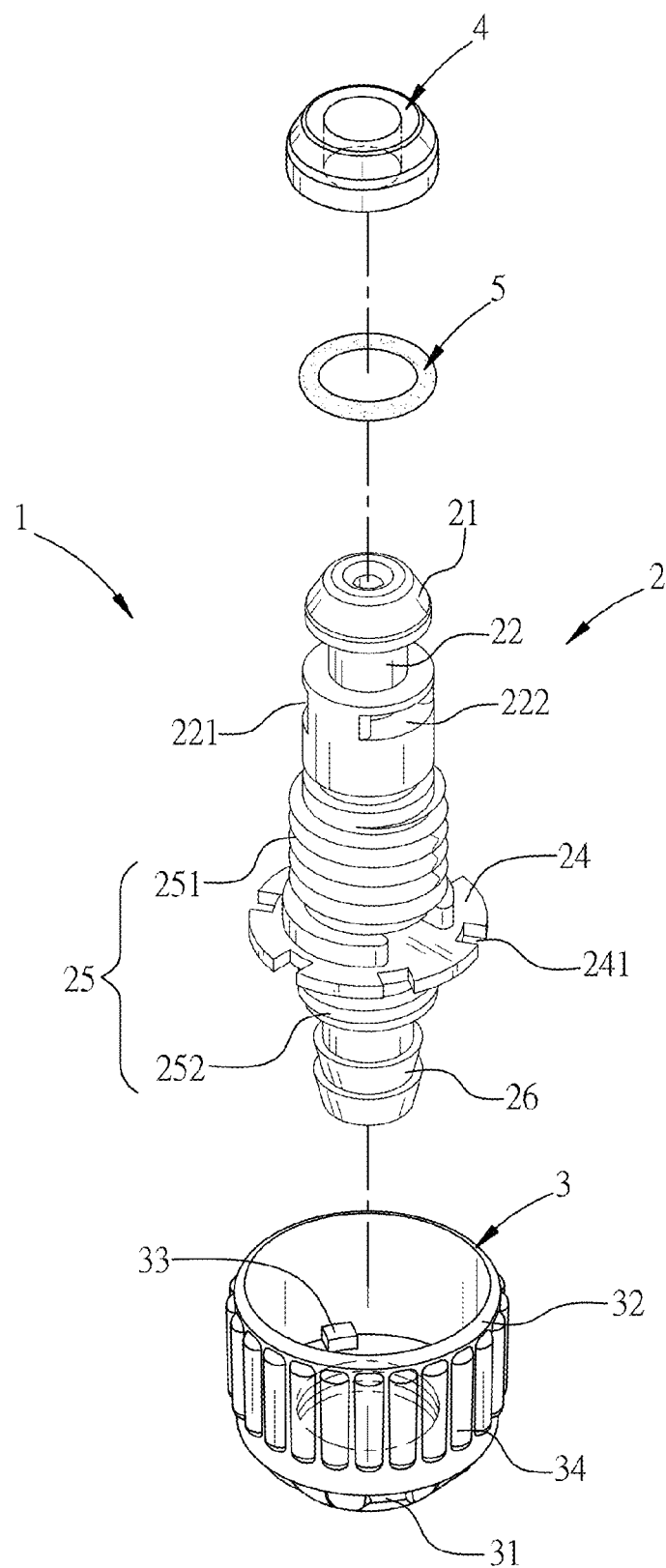
FIG. 1 is an exploded view showing the oil drain connector of the present invention.
Figure 2:
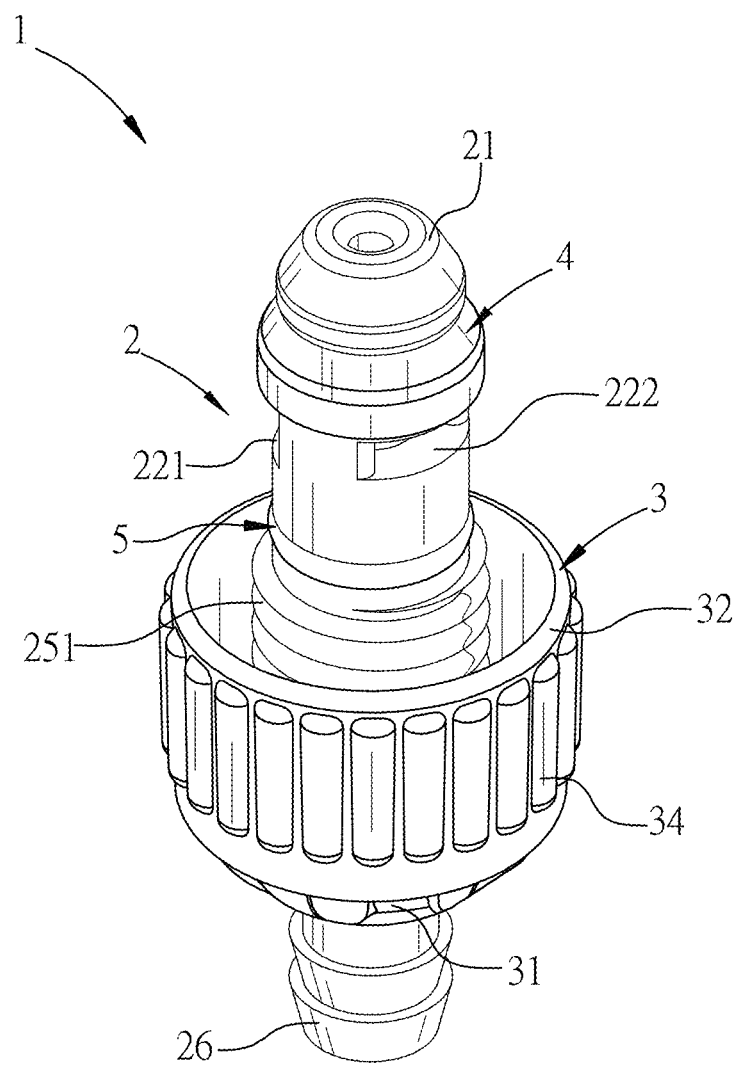
FIG. 2 is a perspective view showing the oil drain connector of the present invention.
Figure 3:
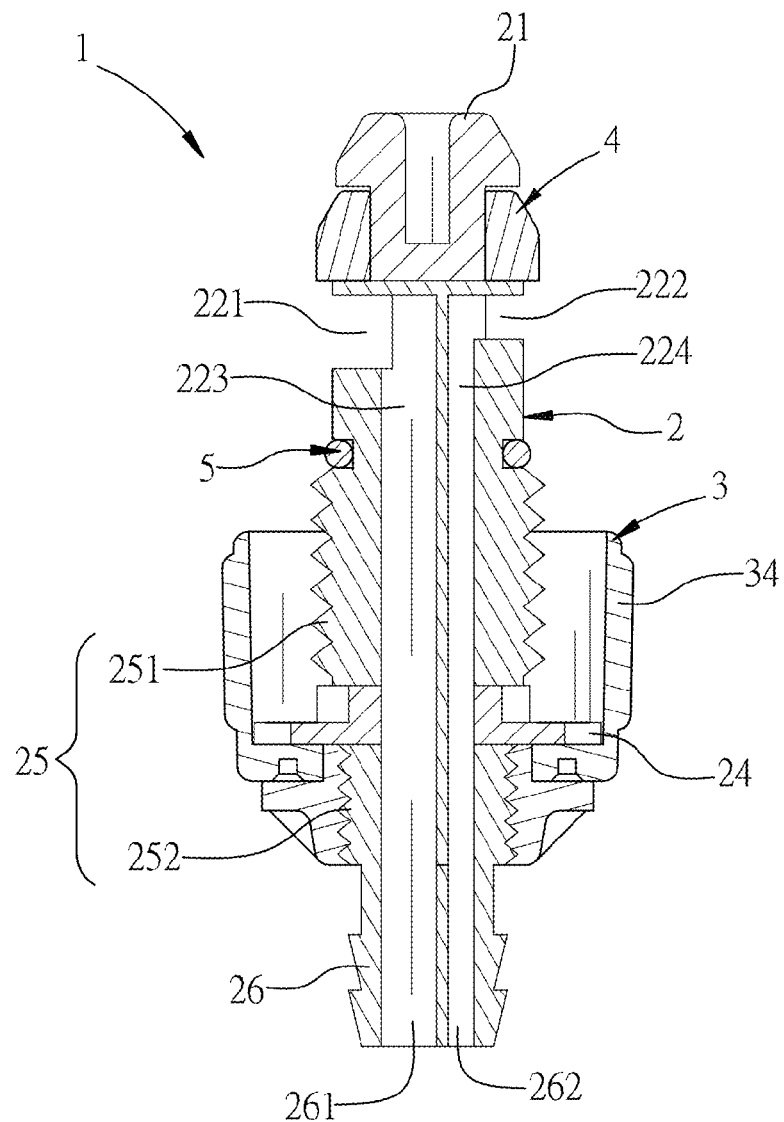
FIG. 3 is a sectional view showing the oil drain connector of the present invention.
Figure 4:
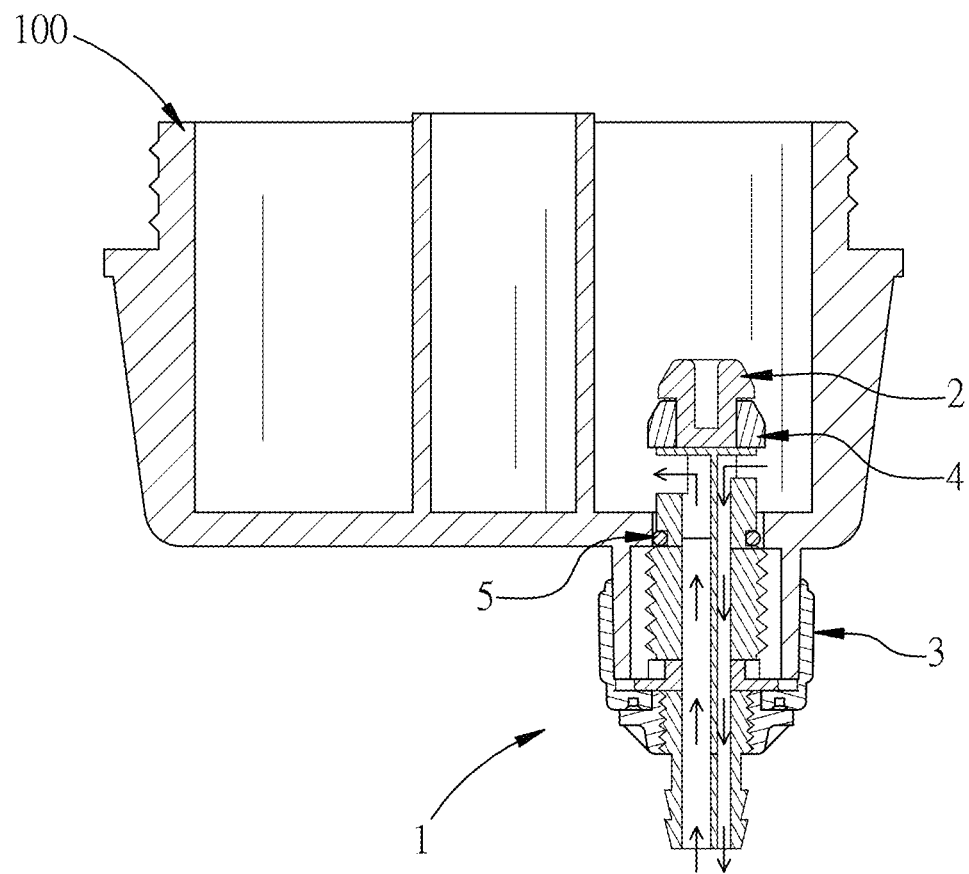
FIG. 4 is a schematic view showing operation of the oil drain connector of the present invention installed to a container.
Figure 5:
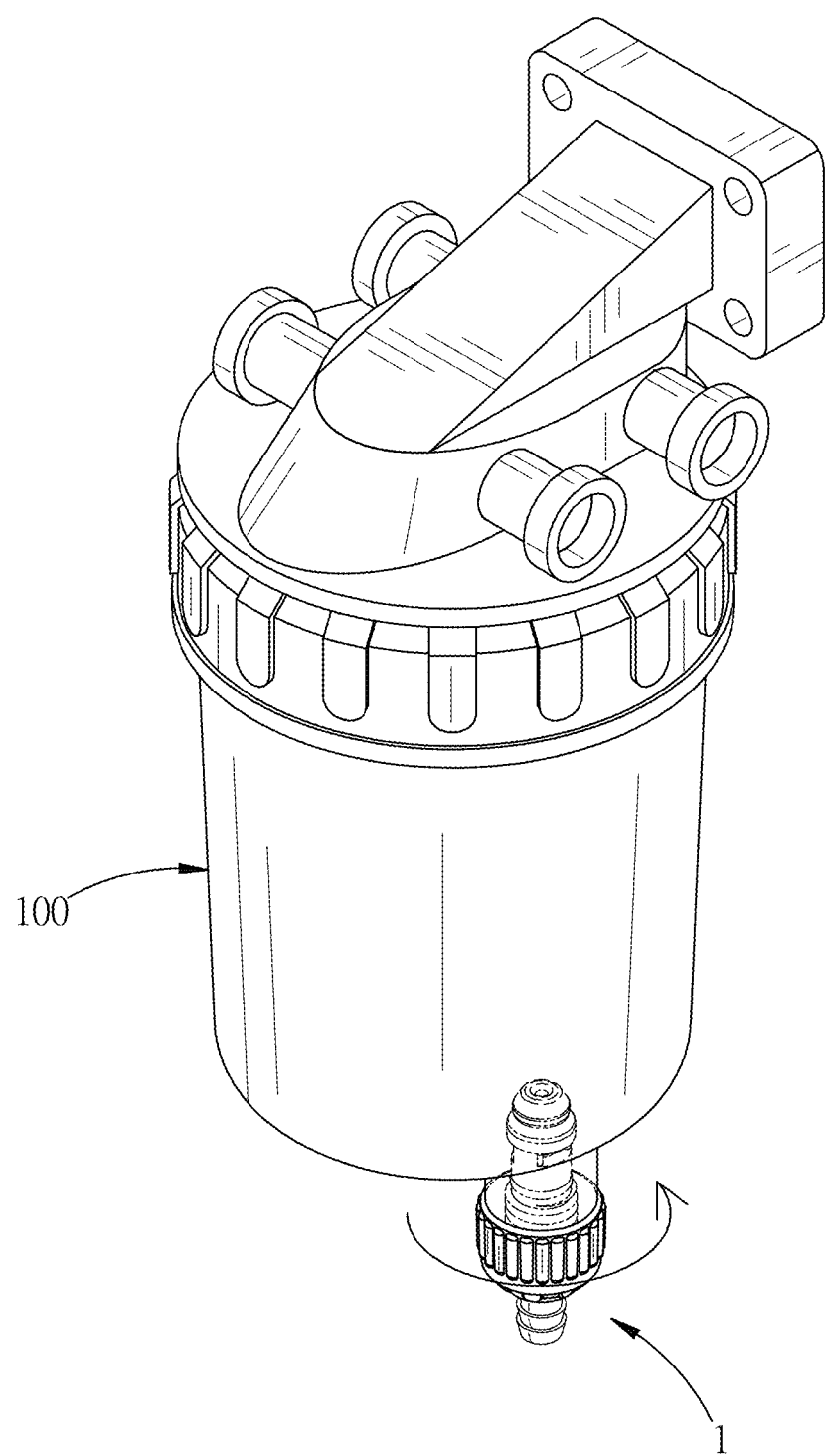
FIG. 5 is a perspective view showing the oil drain connector of the present invention installed to the container.

FIG. 1 is an exploded view showing the oil drain connector of the present invention. FIG. 2 is a perspective view showing the oil drain connector of the present invention. FIG. 3 is a sectional view showing the oil drain connector of the present invention. FIG. 4 is a schematic view showing operation of the oil drain connector of the present invention installed to a container. FIG. 5 is a perspective view showing the oil drain connector of the present invention installed to the container.

Referring to FIG. 1 to FIG. 5, the oil drain connector 1 of the present invention can be disposed at the bottom of a container 100 for the container 100 to drain the liquid inside the container 100 or release pressure. Wherein, the container can be a water filter or an oil-water filter, but not limited.

The oil drain connector 1 of the present invention comprises a main body 2 and a sleeve 3.

The main body 2 has a head portion 21, an axial portion 22, an annular engaging portion 24, an outer threaded portion 25, and a bottom portion 26. Two ends of the axial portion 22 are respectively connected to the head portion 21 and the bottom portion 26. The outer threaded portion 25 is disposed on the axial portion 22 and located between the head portion 21 and the bottom portion 26. The annular engaging portion 24 is disposed on the outer threaded portion 25 to divide the outer threaded portion 25 into an upper section 251 and a lower section 252. The annular engaging portion 24 has a plurality of spaced notches 241 formed around a circumferential portion thereof. The bottom portion 26 has a liquid outlet 261 and an air inlet 262. The axial portion 22 has a liquid inlet 221, an air outlet 222, a first channel 223, and a second channel 224. The liquid inlet 221 is disposed at one side of the axial portion 22 and located between the head portion 21 and the upper section 251 of the outer threaded portion 25. The first channel 223 is disposed inside the axial portion 22 and communicates with the liquid inlet 221 and the liquid outlet 261 of the bottom portion 26. The air outlet 222 is disposed at another side of the axial portion 22, opposite to the liquid inlet 221, and located between the head portion 21 and the upper section 251 of the outer threaded portion 25. The second channel 224 is disposed inside the axial portion 22 and separated from the first channel 223. The second channel 224 communicates with the air outlet 222 and the air inlet 262 of the bottom portion 26.

Furthermore, the air outlet 222 is more close to the head portion 21 than the liquid inlet 221, so that the air outlet 222 is slightly higher than the liquid inlet 221 in the vertical direction. Thus, the liquid in the container is first contact with liquid inlet 222 to be drained, and at the same time the air enters the container through the air inlet 262 and the air outlet 222 for the liquid to be drained smoothly.

The sleeve 3 has an inner threaded portion 31, an annular side wall 32 and a plurality of protrusions 33. The inner threaded portion 31 is screwed to the lower section 252 of the outer threaded portion 25 of the main body 2. The annular side wall 32 extends from the outer circumferential edge of the top end of the inner threaded portion 31 toward the head portion 21 of the main body 2. The protrusions 33 are disposed between the inner threaded portion 31 and the annular side wall 32 and correspond in position to the notches 241 of the annular engaging portion 24 to engage with each other.

Furthermore, the annular side wall 32 of the sleeve 3 has a skidproof outer surface 34 to provide a skidproof effect when the user turns the sleeve 3.

In addition, the oil drain connector 1 of the present invention further comprises a cover 4 and an O-shaped ring 5. The cover 4 is to cover the head portion 21 of the main body 2. The O-shaped ring 5 is fitted on the axial portion 22 of the main body 2 and located under the head portion 21 for tightly connecting with the container 100, preventing the liquid from leaking.

When it is required to release pressure, the sleeve 3 is turned to loosen the upper section 251 of the outer threaded portion 25 relative to the container 100. Because the air outlet 222 is more close to the head portion 21 than the liquid inlet 221, namely, the air outlet 222 is slightly higher than the liquid inlet 221 in the vertical direction, the liquid 100 inside the container 100 is first contact with the liquid inlet 221 to pass through the first channel and then to be drained through the liquid outlet 261. At this time, the air enters the second channel 224 through the air inlet 262, and then enters the container 100 for the liquid to be drained smoothly.

Accordingly, the present invention has a simple structure and can be installed conveniently. When in use, it is easy to operate the present invention and the liquid won't leak out from other positions.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An oil drain connector, comprising:
a main body, the main body having
a head portion,
an axial portion,
an annular engaging portion,
an outer threaded portion and a bottom portion,
the axial portion having two ends respectively connected to the head portion and the bottom portion,
the outer threaded portion being disposed on the axial portion and located between the head portion and the bottom portion,
the annular engaging portion being disposed on the outer threaded portion to divide the outer threaded portion into an upper section and a lower section,
the annular engaging portion having a plurality of spaced notches formed around a circumferential portion thereof,
the bottom portion having a liquid outlet and an air inlet,
the axial portion having a liquid inlet, an air outlet, a first channel and a second channel,
the liquid inlet being disposed at one side of the axial portion and located between the head portion and the upper section of the outer threaded portion, the first channel being disposed inside the axial portion and communicating with the liquid inlet and the liquid outlet of the bottom portion, the air outlet being disposed at another side of the axial portion, opposite to the liquid inlet, and located between the head portion and the upper section of the outer threaded portion, the second channel being disposed inside the axial portion and separated from the first channel, the second channel communicating with the air outlet and the air inlet of the bottom portion; and
a sleeve, the sleeve having
an inner threaded portion,
an annular side wall and
a plurality of protrusions,
the inner threaded portion being screwed to the lower section of the outer threaded portion of the main body,
the annular side wall extending from an outer circumferential edge of a top end of the inner threaded portion toward the head portion of the main body, and
the protrusions being disposed between the inner threaded portion and the annular side wall and corresponding in position to the notches of the annular engaging portion to engage with each other.

2. The oil drain connector as claimed in claim 1, wherein the annular side wall of the sleeve has a skidproof outer surface.

3. The oil drain connector as claimed in claim 1, wherein the air outlet is located closer to the head portion than the liquid inlet.

4. The oil drain connector as claimed in claim 1, further comprising a cover and an O-shaped ring, the cover being to cover the head portion of the main body, the O-shaped ring being fitted on the axial portion of the main body and located under the head portion.

* * * * *